US012735108B2

(12) United States Patent
Choi et al.

(10) Patent No.: US 12,735,108 B2
(45) Date of Patent: Sep. 15, 2026

(54) MOBILITY VEHICLE AND METHOD OF CONTROLLING THE SAME

(71) Applicants: Hyundai Motor Company, Seoul (KR); Kia Corporation, Seoul (KR)

(72) Inventors: Jae Hyuk Choi, Hwaseong-si (KR); Geun Sang Yu, Hwaseong-si (KR); Jea Kyoo An, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 39 days.

(21) Appl. No.: 18/914,413

(22) Filed: Oct. 14, 2024

(65) Prior Publication Data

US 2025/0388265 A1 Dec. 25, 2025

(30) Foreign Application Priority Data

Jun. 19, 2024 (KR) ........................ 10-2024-0079382

(51) Int. Cl.
*B62D 21/14* (2006.01)
*G05D 1/622* (2024.01)

(52) U.S. Cl.
CPC ............. *B62D 21/14* (2013.01); *G05D 1/622* (2024.01)

(58) Field of Classification Search
CPC ......... B62D 21/14; B62D 61/00; G05D 1/622
See application file for complete search history.

(56) References Cited

U.S. PATENT DOCUMENTS 6,164,674 A * 12/2000 Rogers ................. A61G 5/1054 280/42
8,454,048 B1 * 6/2013 Regan .................. A61G 5/0825 280/649
2008/0190682 A1 * 8/2008 Mahy ................... B60G 17/015 180/209
2013/0257009 A1 * 10/2013 Rogers ..................... A61G 5/08 280/639
2014/0129129 A1 * 5/2014 Prokhorov .......... B60R 21/0134 701/301
2017/0100291 A1 * 4/2017 Bednarz, III ........ A61G 5/0825
2021/0338501 A1 * 11/2021 Joyce ..................... A61G 5/122
2023/0143465 A1 * 5/2023 Kwon .................. B62D 63/025 280/785
2025/0360962 A1 * 11/2025 Choi ......................... B62B 3/02

FOREIGN PATENT DOCUMENTS

AT 387516 B * 2/1989 ............... A61H 3/00
CN 116573049 A 8/2023
CN 219536786 U 8/2023
DE 102010054603 A1 * 6/2012 ............. H02K 37/12
GB 2594598 A * 11/2021 ......... B62D 49/0664
KR 102401563 B1 5/2022

* cited by examiner

*Primary Examiner* — Daniel M. Robert
(74) *Attorney, Agent, or Firm* — Slater Matsil, LLP

(57) ABSTRACT

A mobility vehicle can include a body part, a plurality of support frames configured to support the body part and rotate about a first rotation axis relative to the body part, and a plurality of movement parts respectively connected to the plurality of support frames and configured to move the body part and the support frames, in which the body part and the support frames are configured to be allowed to rotate about the first rotation axis relative to one another in a state in which the body part and the support frames are supported on one another in a direction in which the first rotation axis extends.

20 Claims, 6 Drawing Sheets

MOBILITY VEHICLE AND METHOD OF CONTROLLING THE SAME

CROSS-REFERENCE TO RELATED APPLICATIONS

This application claims priority to and the benefit of Korean Patent Application No. 10-2024-0079382 filed in the Korean Intellectual Property Office on Jun. 19, 2024, the entire contents of which are incorporated herein by reference.

TECHNICAL FIELD

The present disclosure relates to a mobility vehicle and a method of controlling the same.

BACKGROUND

Recently, plug-and-drive (PnD) module-based robots have been actively developed. The robot is equipped with a body part capable of supporting an object, a plurality of wheels configured to allow the body part to travel, and a steering system configured to steer the plurality of wheels.

The robot in the related art has been manufactured so that positions of the wheels relative to the body part are fixed. In case that the positions of the wheels relative to the body part are fixed, there is a problem in that a horizontal width of a mobility vehicle cannot be adjusted.

For example, there is a problem in that a mobility vehicle manufactured to have a relatively large horizontal width has difficulty in entering a space, such as an elevator or hallway, with a relatively small width. Further, there is a problem in that a risk of rollover accident of a mobility vehicle manufactured to have a relatively small horizontal width increases in a situation in which the mobility vehicle travels at a high speed.

SUMMARY

An embodiment of the present disclosure can provide a mobility vehicle capable of adjusting a horizontal width.

In an embodiment of the present disclosure, a mobility vehicle can include: a body part; a plurality of support frames configured to support the body part and rotate about a first rotation axis relative to the body part; and a plurality of movement parts respectively connected to the plurality of support frames and configured to move the body part and the support frames, in which the body part and the support frames are configured to be allowed to rotate about the first rotation axis relative to one another in a state in which the body part and the support frames are supported on one another in a direction in which the first rotation axis extends.

The first rotation axis may extend in an upward/downward direction, and the mobility vehicle may further include: a first engagement part formed on a lower surface of the body part; and a second engagement part formed on an upper surface of the support frame, any one of the first engagement part and the second engagement part may be a protrusion, and the other of the first engagement part and the second engagement part may be a groove into which the protrusion is inserted.

The first engagement part may be a protrusion having a shape protruding downward from the lower surface of the body part, and the second engagement part may be a groove having a shape recessed downward from the upper surface of the support frame.

The second engagement part may have an arc shape with a predetermined radius based on the first rotation axis as a center when a top side of the mobility vehicle is viewed in parallel with the upward/downward direction, the second engagement part may be provided as a plurality of second engagement parts respectively provided on the plurality of support frames, and the plurality of second engagement parts may be disposed to be spaced apart from one another in a circumferential direction that is a direction in which the first engagement part extends.

The plurality of support frames may be configured to rotate about the first rotation axis relative to the body part between a first posture in which a horizontal width of the mobility vehicle is a maximum horizontal width and a second posture in which the horizontal width of the mobility vehicle is a minimum horizontal width, and the mobility vehicle may further include a motion restriction part configured to restrict motions of the plurality of support frames so that the plurality of support frames moves in a posture between the first posture and the second posture.

The motion restriction part may be positioned between the two second engagement parts adjacent to each other in the circumferential direction among the plurality of second engagement parts.

The motion restriction part may be provided as a plurality of motion restriction parts, the plurality of motion restriction parts may each have a shape protruding in a horizontal direction from the support frame, and the two motion restriction parts, which are adjacent to each other among the plurality of motion restriction parts, may be in contact with each other when the plurality of support frames is placed in the second posture.

The motion restriction part may have a shape protruding downward from the lower surface of the body part, the motion restriction part may be provided as a plurality of motion restriction parts, and the plurality of motion restriction parts and the plurality of second engagement parts may be alternately disposed in the circumferential direction.

The mobility vehicle may further include a link configured to connect the plurality of support frames and define the first rotation axis, in which the link can be positioned inside the first engagement part when a top side of the mobility vehicle is viewed in parallel with the upward/downward direction. The second engagement part may be disposed between one end of the support frame and the link.

The mobility vehicle may further include: a link configured to connect the plurality of support frames and define the first rotation axis; and an encoder configured to acquire information on angles defined by the plurality of support frames, in which the encoder can be disposed below the link.

The mobility vehicle may further include a brake configured to stop relative movements of the plurality of support frames, in which the brake can be disposed below the link.

In an embodiment of the present disclosure, a mobility vehicle can include: a body part; a plurality of support frames configured to support the body part and rotate about a first rotation axis relative to the body part; a plurality of movement parts respectively connected to the plurality of support frames and configured to move the body part and the support frames; and a controller configured to control motions of the plurality of support frames to adjust a horizontal width of the mobility vehicle.

The plurality of support frames may include: a first support frame extending in a first direction; and a second support frame having a central portion disposed to intersect a central portion of the first support frame, with the second support frame extending in a second direction intersecting the first direction. The first support frame may include: a first-first frame region configured to define one end of the first support frame and extending from the central portion of the first support frame to one side of the first support frame based on the first direction; and a first-second frame region configured to define the other end of the first support frame and extending from the central portion of the first support frame to the other side of the first support frame based on the first direction. The second support frame may include: a second-first frame region configured to define one end of the second support frame and extending from the central portion of the second support frame to one side of the second support frame based on the second direction; and a second-second frame region configured to define the other end of the second support frame and extending from the central portion of the second support frame to the other side of the second support frame based on the second direction, and the first-first frame region, the second-first frame region, the first-second frame region, and the second-second frame region may be alternately disposed in the circumferential direction.

The controller may control the motions of the plurality of support frames so that one end of the first-first frame region and one end of the second-first frame region become close to each other when a contraction signal, which can be a signal indicating that the horizontal width of the mobility vehicle is required to be decreased, is inputted, and the controller may control the motions of the plurality of support frames so that one end of the first-first frame region and one end of the second-first frame region become distant from each other when an expansion signal, which can be a signal indicating that the horizontal width of the mobility vehicle is required to be increased, is inputted.

The movement parts may include: front wheels respectively connected to one end of the first-first frame region and one end of the second-first frame region; and rear wheels respectively connected to one end of the first-second frame region and one end of the second-second frame region, and the controller may control the movement parts so that speeds of the front and rear wheels are different from one another when any one of the contraction signal and the expansion signal is inputted.

The mobility vehicle may further include: a plurality of movement parts respectively connected to the plurality of support frames and configured to move the body part and the support frames; and a detection part configured to detect a motion of an object in a peripheral region of the mobility vehicle, in which the controller receives, from the detection part, an avoidance signal, which can be a signal indicating that the mobility vehicle is required to avoid the object, when the motion of the object in the peripheral region is detected by the detection part, in which the movement parts include a plurality of wheels respectively connected to one end of the first-first frame region, one end of the first-second frame region, one end of the second-first frame region, and one end of the second-second frame region, and in which when a wheel, which is positioned to be closest to the object among the plurality of wheels, is a short-distance wheel and a wheel, which is positioned to be farthest from the short-distance wheel, is a long-distance wheel, the controller, to which the avoidance signal is inputted, controls the movement parts so that the long-distance wheel is oriented in a direction intersecting the short-distance wheel.

In an embodiment of the present disclosure, a method of controlling the mobility vehicle can include: a contraction signal input operation of inputting a contraction signal that is a signal indicating that the horizontal width of the mobility vehicle is required to be decreased; a contraction control operation of controlling the motions of the plurality of support frames so that one end of the first-first frame region and one end of the second-first frame region become close to each other when the contraction signal input operation is performed; an expansion signal input operation of inputting an expansion signal that can be a signal indicating that the horizontal width of the mobility vehicle is required to be increased; and an expansion control operation of controlling the motions of the plurality of support frames so that one end of the first-first frame region and one end of the second-first frame region become more distant from each other when the expansion signal input operation is performed.

The movement parts may include: front wheels respectively connected to one end of the first-first frame region and one end of the second-first frame region; and rear wheels respectively connected to one end of the first-second frame region and one end of the second-second frame region, and speeds of the front and rear wheels may be different from one another in the contraction signal input operation or the expansion signal input operation.

The method may further include: a detection operation of detecting a motion of an object in a peripheral region of the mobility vehicle; an avoidance signal input operation of inputting an avoidance signal, which can be a signal indicating that the mobility vehicle is required to avoid the object, when the motion of the object in the peripheral region is detected; and a wheel control operation of orienting a long-distance wheel in a direction intersecting a short-distance wheel when the avoidance signal input operation is performed, in which the movement parts include a plurality of wheels respectively connected to one end of the first-first frame region, one end of the first-second frame region, one end of the second-first frame region, and one end of the second-second frame region, in which the short-distance wheel can be defined as a wheel positioned to be closest to the object among the plurality of wheels, and in which the long-distance wheel can be defined as a wheel positioned to be farthest from the short-distance wheel.

A mobility vehicle according to an embodiment of the present disclosure may be configured to adjust the horizontal width, thereby flexibly coping with various situations by adjusting the horizontal width.

DETAILED DESCRIPTION OF ILLUSTRATIVE EMBODIMENTS

Figure 1:
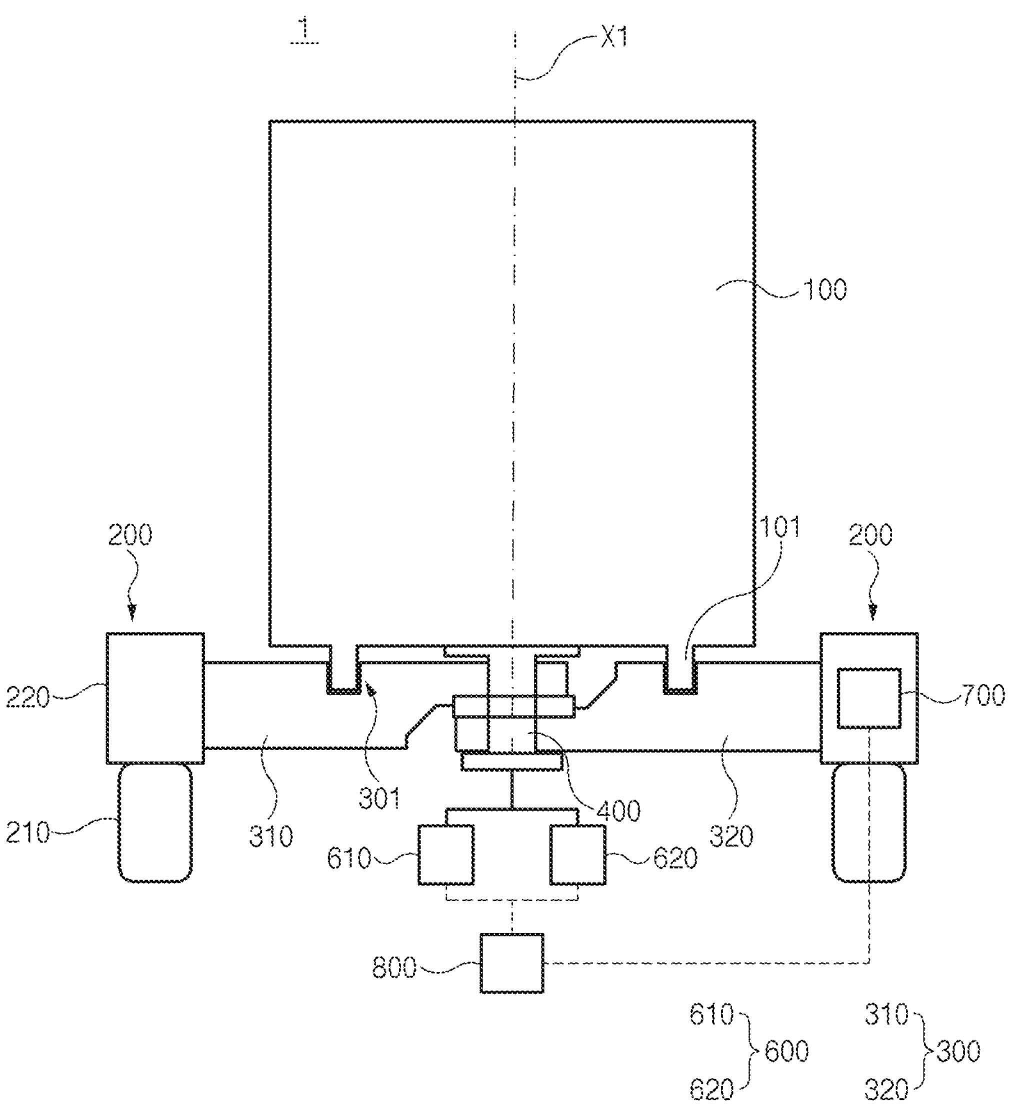
FIG. 1 is a front view illustrating a front side of a mobility vehicle according to an embodiment of the present disclosure.

Hereinafter, some example embodiments of the present disclosure will be described in detail with reference to the illustrative drawings. In giving reference numerals to constituent elements of the respective drawings, same constituent elements can be designated by same reference numerals, if possible, even though the constituent elements can be illustrated in different drawings. Further, in the following description of the example embodiments of the present disclosure, a detailed description of related publicly-known configurations or functions can be omitted when it is determined that the detailed description of such can obscure an understanding of the example embodiments of the present disclosure.

Hereinafter, a mobility vehicle 1 according to example embodiments of the present disclosure will be described with reference to the drawings.

Figure 2:
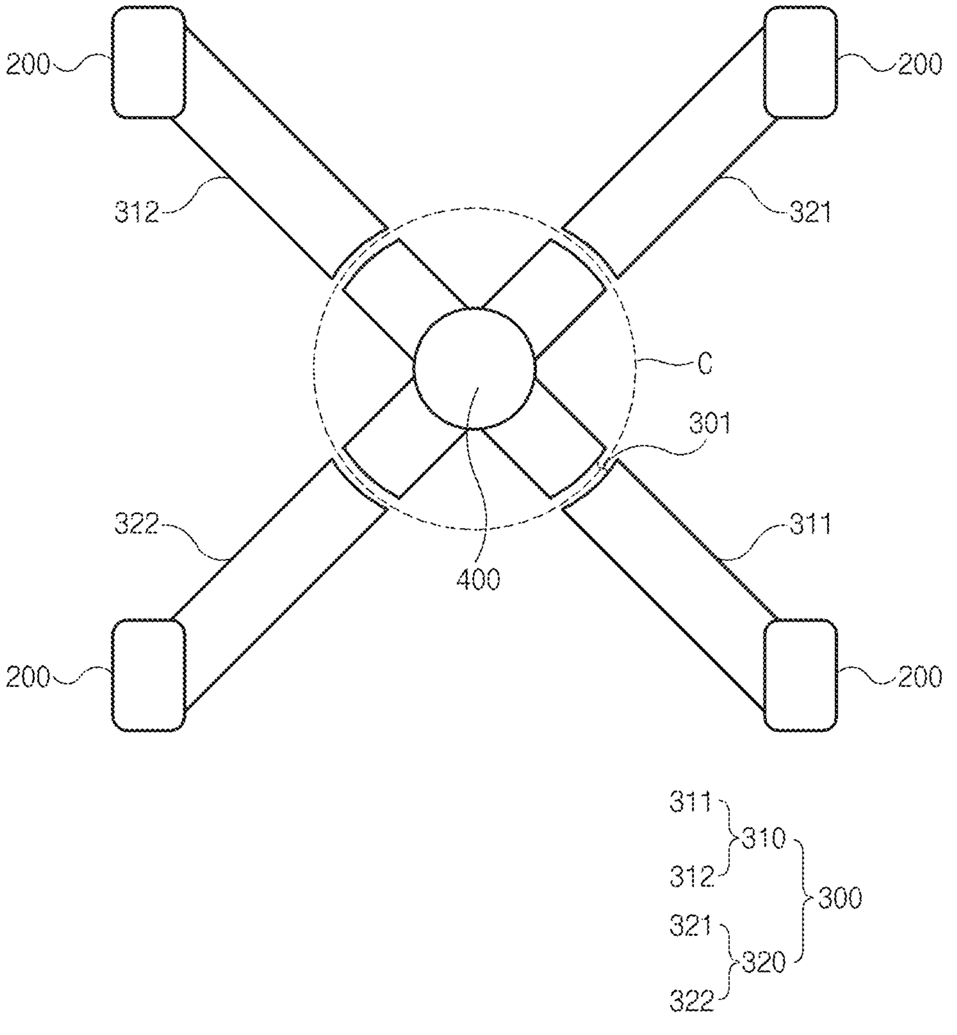
FIG. 2 is a top plan view of the mobility vehicle according to an embodiment of the present disclosure from which a body part is excluded.
Figure 3:
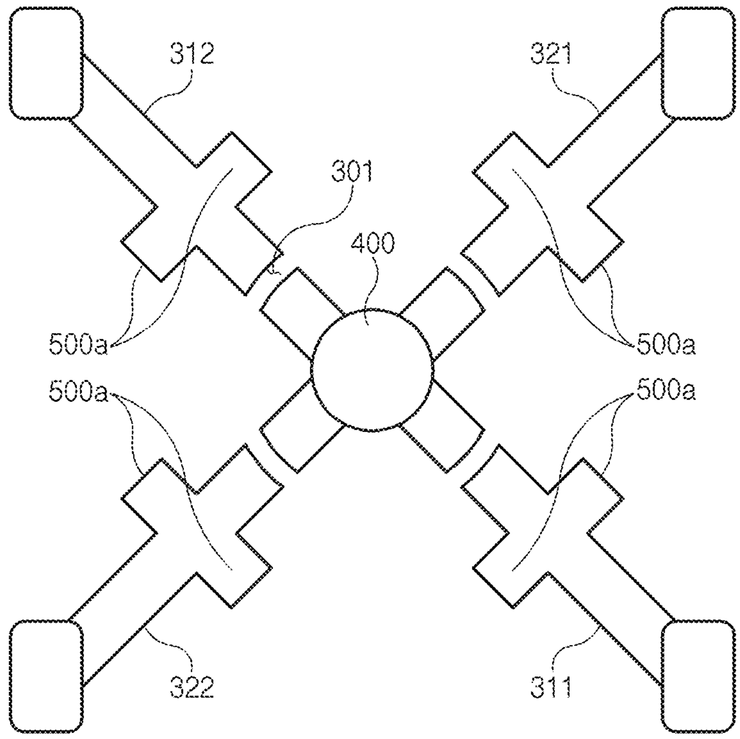
FIG. 3 is a top plan view illustrating a state in which motion restriction parts according to an embodiment of the present disclosure are connected to support frames.

FIG. 1 is a front view with partial cross-sectional views illustrating a front side of the mobility vehicle 1 according to an embodiment of the present disclosure. FIG. 2 is a top plan view of the mobility vehicle 1 according to an embodiment of the present disclosure from which a body part is excluded. FIG. 3 is a top plan view illustrating a state in which motion restriction parts according to an embodiment of the present disclosure are connected to a support frame.

With reference to FIGS. 1 to 3, the mobility vehicle 1 may travel on a ground surface. The mobility vehicle 1 may move an object, which is required/desired to be moved between locations, to a targeted position. The mobility vehicle 1 may include a body part 100, movement parts 200, support frames 300, a link 400, motion restriction parts 500*a*, a drive part 600, a detection part 700, and a controller 800, any combination of or all of which may be in plural or may include plural components thereof.

The body part 100 may provide a space for seating an object that is required/desired to be moved. The body part 100 may be moved by the movement part 200. The body part 100 may be disposed above the support frame 300. The body part 100 may have a first engagement part 101.

The first engagement part 101 may engage with second engagement parts 301 to be described below. The configuration in which two components engage with each other may be understood as a concept including not only a case in which the two components are fully tightly attached to each other but also a case in which the two components are prevented from moving a predetermined distance or more in any one direction relative to each other, for example.

The first engagement part 101 may have a shape protruding downward from a lower surface of the body part 100. The first engagement part 101 may have a ring shape. For example, the first engagement part 101 may have a circular shape. A direction in which the first engagement part 101 extends may be referred to as a circumferential direction.

The movement parts 200 may move the body part 100 relative to the ground surface. Each movement part 200 may be fixed or mechanically coupled to the support frame 300. Each movement part 200 may be controlled by the controller 800. Each movement part 200 may include a wheel 210 and a steering region 220.

The wheel 210 may be disposed below the steering region 220. An upper end of the wheel 210 may be disposed below a lower end of the body part 100. As described above, the body part 100 may be disposed above the wheel 210, which may prevent the wheel 210 and the body part 100 from interfering with each other while the wheel 210 moves relative to the body part 100.

The steering region 220 may steer the wheel 210. The steering region 220 may rotate the wheel 210 about a steering rotation axis relative to the body part 100. The steering rotation axis may be an imaginary straight line passing through the movement part 200 and extending in parallel with an upward/downward direction, for example. The steering region 220 and the wheel 210 may be connected to each other and configured to be pivotable/rotatable relative to each other. The steering region 220 may be fixed to or mechanically coupled to one end of the support frame 300.

The movement parts 200 may be provided as a plurality of movement parts 200. The plurality of movement parts 200 may include a first movement part, a second movement part, a third movement part, and a fourth movement part. The first movement part, the second movement part, the third movement part, and the fourth movement part may be sequentially disposed in a peripheral direction of the body part 100. The wheels 210, which can be respectively provided in the first movement part, the second movement part, the third movement part, and the fourth movement part, may be referred to as a first wheel, a second wheel, a third wheel, and a fourth wheel. The steering regions 220, which can be respectively provided in the first movement part, the second movement part, the third movement part, and the fourth movement part, may be referred to as a first steering region, a second steering region, a third steering region, and a fourth steering region.

The first movement part, the second movement part, the third movement part, and the fourth movement part may be respectively connected to one end of a first-first frame region 311, one end of a second-first frame region 321, one end of a first-second frame region 312, and one end of a second-second frame region 322, to be described below.

The support frame 300 may support the body part 100. The support frame 300 may rotate about a first rotation axis X1 relative to the body part 100. The first rotation axis X1 may be defined as an imaginary straight line passing through the link 400 and extending in parallel with the upward/downward direction.

The support frame 300 and the body part 100 may be provided such that the support frame 300 and/or the body part 100 are allowed to rotate about the first rotation axis X1 relative to each other in a state in which the support frame 300 and the body part 100 are supported on each other in the upward/downward direction. For example, the support frame 300 may be configured to be rotatable relative to the body part 100 in the state in which the first engagement part 101 of the body part 100 engages with the second engagement part 301 of the support frame 300. As described above, because the support frame 300 can be rotatably provided on the body part 100 in the state in which the first engagement part 101 and the second engagement part 301 engage with each other, the horizontal movement of the support frame 300 relative to the body part 100 may be restricted while the support frame 300 rotates. The support frame 300 may have at least one of the second engagement part 301.

The second engagement part 301 may engage with the first engagement part 101. For example, the second engagement part 301 may be a groove having a shape recessed downward from an upper surface of the support frame 300. The second engagement part 301 may have an arc shape with a predetermined radius based on the first rotation axis X1 as a center when the top side of the mobility vehicle 1 is viewed in parallel with the upward/downward direction.

In a more detailed example, the second engagement part 301 may overlap at least a part of an imaginary circle C having a predetermined radius and having a center intersecting the first rotation axis X1. The second engagement part 301 may be disposed between one end (e.g., a distal end) of the support frame 300 and the link 400.

The support frame 300 may be provided as a plurality of support frames 300. When a posture of the plurality of support frames 300, in which a horizontal width of the mobility vehicle 1 is a maximum horizontal width, is a first posture and a posture of the plurality of support frames 300, in which the horizontal width of the mobility vehicle 1 is a minimum horizontal width, is a second posture, the plurality of support frames 300 may rotate about the first rotation axis X1 between the first posture and the second posture relative to the body part 100.

The plurality of support frames 300 may include a first support frame 310 and a second support frame 320. The first support frame 310 may extend in a first direction that is one of the horizontal directions. A central portion of the first support frame 310 may be disposed to intersect a central portion of the second support frame 320. The first support frame 310 may include the first-first frame region 311 and the first-second frame region 312.

The first-first frame region 311 may be one side of the first support frame 310 based on the first direction. For example, the first-first frame region 311 may have a shape extending from the central portion of the first support frame 310 to one side of the first support frame 310 based on the first direction.

The first-second frame region 312 may be the other side of the first support frame 310 based on the first direction. For example, the first-second frame region 312 may have a shape extending from the central portion of the first support frame 310 to the other side of the first support frame 310 based on the first direction. For example, the first-first frame region 311 and the first-second frame region 312 may be integrated.

The second support frame 320 may extend in a second direction intersecting the first direction. An angle defined between an imaginary first straight line extending in the first direction and an imaginary second straight line extending in the second direction may be variable. For example, when the plurality of support frames 300 is in the first posture, the first straight line and the second straight line may be perpendicular to each other, for example. As another example, when the plurality of support frames 300 is in the second posture, a minimum critical angle, which can be an angle between the first straight line and the second straight line, may be an acute angle. The second support frame 320 may include the second-first frame region 321 and the second-second frame region 322.

The second-first frame region 321 may define one side of the second support frame 320 based on the second direction. For example, the second-first frame region 321 may have a shape extending from the central portion of the second support frame 320 to one side of the second support frame 320 based on the second direction.

The second-second frame region 322 may define the other side of the second support frame 320 based on the second direction. For example, the second-second frame region 322 may have a shape extending from the central portion of the second support frame 320 to the other side of the second support frame 320 based on the second direction. For example, the second-first frame region 321 and the second-second frame region 322 may be integrated.

The first-first frame region 311, the second-first frame region 321, the first-second frame region 312, and the second-second frame region 322 may be disposed about the circumferential direction. The second engagement part 301 may be provided as a plurality of second engagement parts 301. The plurality of second engagement parts 301 may be respectively formed in the first-first frame region 311, the first-second frame region 312, the second-first frame region 321, and the second-second frame region 322. The plurality of second engagement parts 301 may be disposed to be spaced apart from one another in the circumferential direction. For example, all the plurality of second engagement parts 301 may overlap the imaginary circle C.

The link 400 may connect the first support frame 310 and the second support frame 320. The link 400 may be disposed to penetrate the central portion of the first support frame 310 and the central portion of the second support frame 320. An upper end of the link 400 may be connected to a lower surface of the body part 100. For example, the body part 100 may not only be supported on the link 400, but also be supported on the support frame 300.

With reference back to FIG. 3, the motion restriction parts **500*a* may restrict angular motions of the plurality of support frames 300 so that the plurality of support frames 300 can move angularly about the first rotation axis X1 between the first posture and the second posture. For example, the motion restriction parts 500*a* may serve as stoppers that prevent the angle between the first straight line and the second straight line from being smaller than the minimum critical angle. The motion restriction part 500*a* may have a shape protruding in the horizontal direction from the support frame 300**.

The motion restriction part **500*a* may be positioned between the two second engagement parts 301 adjacent to each other in the circumferential direction among the plurality of second engagement parts 301. For example, the motion restriction part 500*a* may be integrated with the support frame 300. For example, the motion restriction part 500*a* may be a component included in the support frame 300**.

The motion restriction part **500*a* may be provided as a plurality of motion restriction parts 500*a*. The plurality of motion restriction parts 500*a* may be respectively provided in/on the first-first frame region 311, the first-second frame region 312, the second-first frame region 321, and the second-second frame region 322. The motion restriction parts, which are respectively provided in the first-first frame region 311, the first-second frame region 312, the second-first frame region 321, and the second-second frame region 322**, may be referred to as a first-first motion restriction part, a first-second motion restriction part, a second-first motion restriction part, and a second-second motion restriction part.

The first-first motion restriction part may have a shape protruding from the first-first frame region 311 toward two opposite sides based on a direction intersecting the first direction. The first-second motion restriction part may have a shape protruding from the first-second frame region 312 toward two opposite sides based on a direction intersecting the first direction. The second-first motion restriction part may have a shape protruding from the second-first frame region 321 toward two opposite sides based on a direction intersecting the second direction. The second-second motion restriction part may have a shape protruding from the second-second frame region 322 toward two opposite sides based on a direction intersecting the second direction.

When the plurality of support frames 300 is placed in the second posture, the two motion restriction parts, which are adjacent to each other among the plurality of motion restriction parts 500*a*, may be in contact with each other. In other words, the two motion restriction parts, which are in contact with each other, may prevent the angular movements of the plurality of support frames 300 so that the first straight line and the second straight line may not be at an angle smaller than the minimum critical angle.

A motion restriction part 500*b* according to a modified example of the embodiment of the present disclosure (hereinafter, referred to as a modified example of the present disclosure) may be configured to be different from the motion restriction part 500*a* according to the embodiment of the present disclosure.

Figure 4:
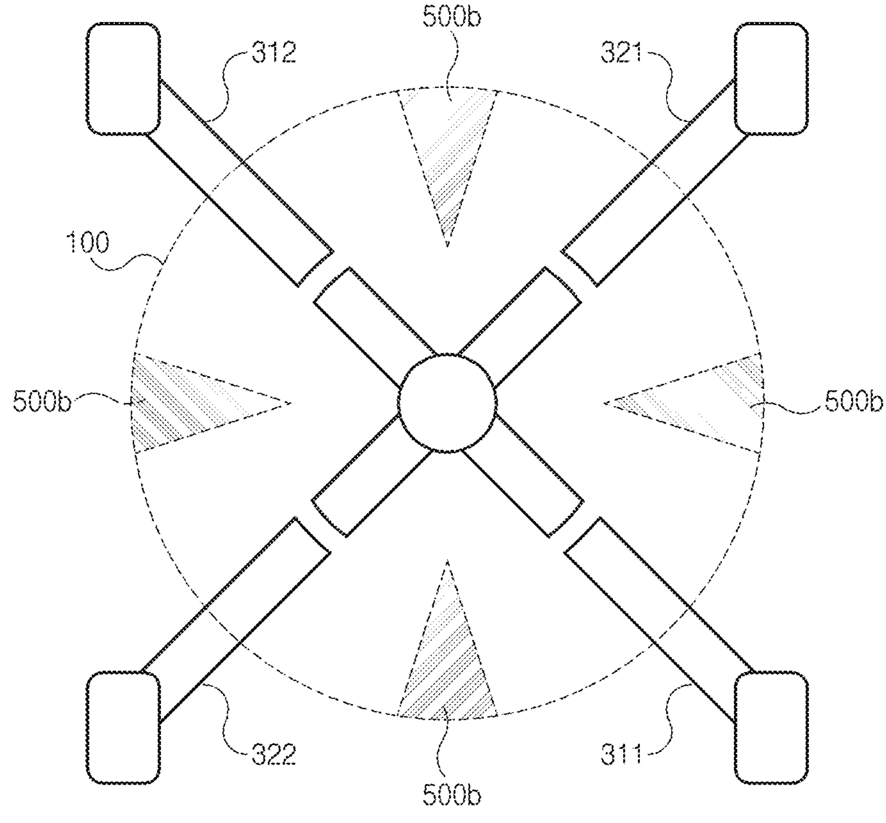
FIG. 4 is a top plan view illustrating a state in which motion restriction parts according to a modified example of an embodiment of the present disclosure are connected to the body part.

FIG. 4 is a view illustrating a state in which the motion restriction parts according to the modified example of the embodiment of the present disclosure are connected to the body part 100.

With reference to FIG. 4, the motion restriction parts 500*b* according to the modified example of the present disclosure may be disposed on the lower surface of the body part 100. The motion restriction part 500*b* may have a shape protruding downward from the lower surface of the body part 100. When the plurality of support frames 300 is placed in the second posture, the motion restriction parts 500*b* may be in contact with the plurality of support frames 300.

The motion restriction part 500*b* may be provided as a plurality of motion restriction parts 500*b*. The plurality of motion restriction parts 500*b* may be arranged to be spaced apart from one another in the circumferential direction. For example, the plurality of motion restriction parts 500*b* and the plurality of second engagement parts 301 may be alternately disposed in the circumferential direction.

The drive part 600 may provide power for rotating the plurality of support frames 300 relative to the body part 100. For example, the drive part 600 may be configured as a motor, a hydraulic actuator, or the like. The drive part 600 may be controlled by the controller 800. The drive part 600 may include an encoder 610 and a brake 620.

The encoder 610 may acquire information on angles defined by the plurality of support frames 300. For example, the encoder 610 may acquire information on angles defined by the first support frame 310 and the second support frame 320. The encoder 610 may be electrically connected to the controller 800.

The brake 620 may stop the movements of the plurality of support frames 300 relative to one another. For example, the brake 620 may stop the rotations of the first and second support frames 310 and 320 relative to each other. The brake 620 may be configured as various types of brakes such as an electronic brake, a disc brake, or a drum brake.

The brake 620 may be controlled by the controller 800 on the basis of the information acquired by the encoder 610. For example, when a targeted angle is defined by the first support frame 310 and the second support frame 320, the brake 620 may stop the rotations of the first and second support frames 310 and 320 relative to each other.

Figure 5:
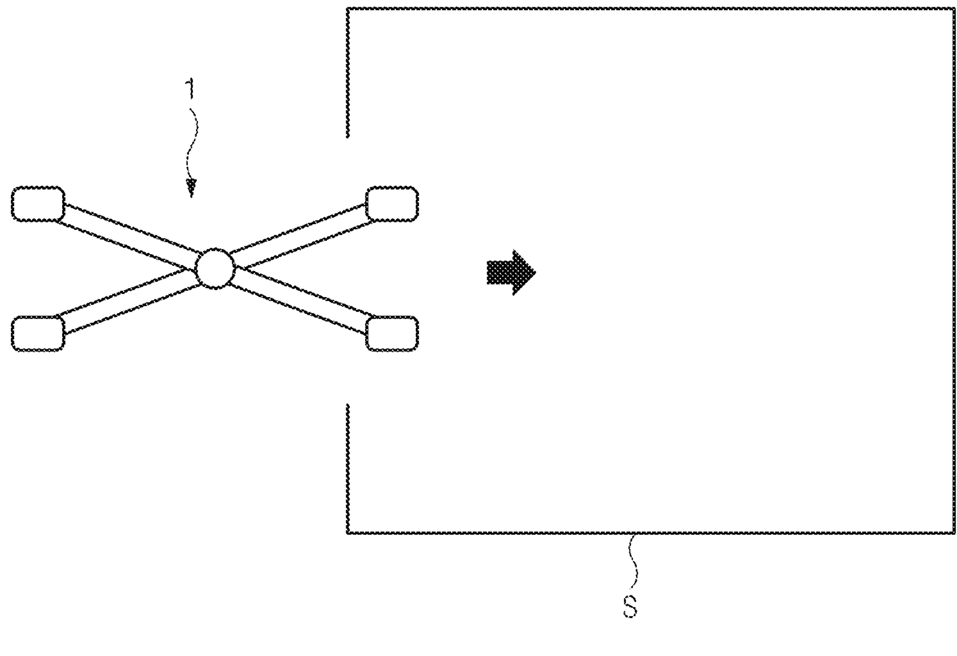
FIG. 5 is a top plan view illustrating a state in which a mobility vehicle according to an embodiment of the present disclosure switches from a first posture to a second posture.
Figure 6:
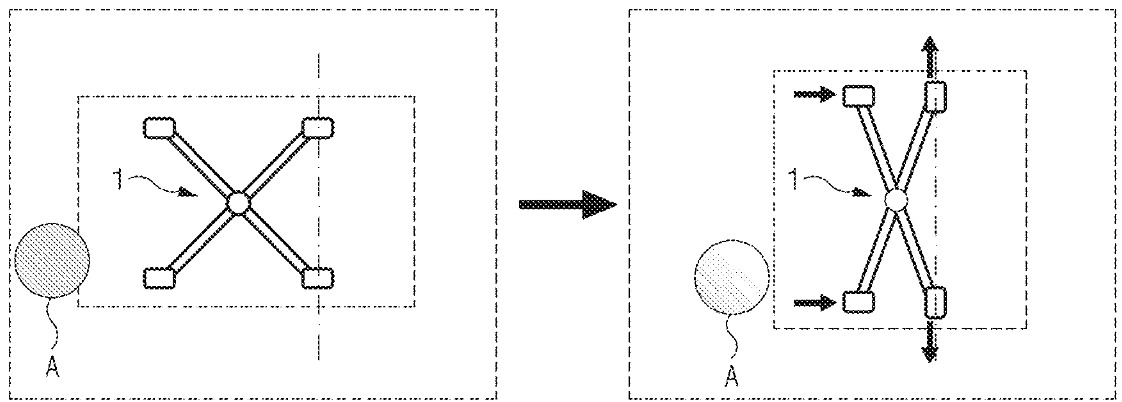
FIG. 6 is a top plan view illustrating a state in which a posture of a mobility vehicle is transformed when a motion of an object is detected in a peripheral region of the mobility vehicle according to an embodiment of the present disclosure.

Referring to FIGS. 1 and 5, the detection part 700 may detect a change in width of a space S in a peripheral region of the mobility vehicle 1. For example, the detection part 700 may detect a difference between a width of a space in which the mobility vehicle 1 is currently positioned and a width of the space S positioned in a scheduled traveling route. Referring to FIGS. 1 and 6, the detection part 700 may detect a motion of an object A in the peripheral region of the mobility vehicle 1. For example, the detection part 700 may include at least one of an infrared sensor, an ultrasonic sensor, and a lidar sensor that are capable of detecting the object A.

The controller 800 may control a horizontal width of the mobility vehicle 1. For example, the controller 800 may control motions of the plurality of support frames 300.

FIG. 5 is a view illustrating a state in which the mobility vehicle according to the embodiment of the present disclosure switches from the first posture to the second posture.

With reference further to FIG. 5, when a contraction signal is inputted to the controller 800, the controller 800 may control the motions of the plurality of support frames 300 so that one end of the first-first frame region 311 and one end of the second-first frame region 321 become close to each other. The contraction signal may be a signal indicating that the size of the mobility vehicle 1 is required to be decreased. For example, the contraction signal may be generated by the detection part 700 on the basis of a detection result from the detection part 700. For example, when the detection part 700 detects that the width of the space in the scheduled traveling route becomes smaller than the width of the space in which the mobility vehicle 1 is currently positioned based on the state in which the mobility vehicle 1 is traveling, the detection part 700 may generate the contraction signal, and the generated contraction signal may be inputted to the controller 800.

When an expansion signal is inputted to the controller 800, the controller 800 may control the motions of the plurality of support frames 300 so that one end of the first-first frame region 311 and one end of the second-first frame region 321 become more distant from each other. The expansion signal may be a signal indicating that the size of the mobility vehicle 1 is required/desired to be increased. For example, the expansion signal may be generated by the detection part 700 on the basis of a detection result from the detection part 700. For example, when the detection part 700 detects that the width of the space in the scheduled traveling route becomes larger than the width of the space in which the mobility vehicle 1 is currently positioned based on the state in which the mobility vehicle 1 is traveling, the detection part 700 may generate the expansion signal, and the generated expansion signal may be inputted to the controller 800.

FIG. 6 is a view illustrating a state in which the posture of the mobility vehicle is transformed when a motion of an object is detected in a peripheral region of the mobility vehicle according to an embodiment of the present disclosure.

With reference further to FIG. 6, in case that the detection part 700 detects a motion of the object A within the peripheral region, the controller 800 may receive an avoidance signal from the detection part 700. The avoidance signal may be a signal indicating that the mobility vehicle is required/desired to avoid the object A. For example, the avoidance signal may be generated by the detection part 700 on the basis of a detection result from the detection part 700.

The controller 800, to which the avoidance signal is inputted, may control the movement parts 200 so that a speed of a short-distance wheel is higher than a speed of a long-distance wheel. A short-distance wheel may be a wheel positioned to be closest to the object A among the plurality of wheels. A long-distance wheel may be the wheel positioned to be farthest from the object A among the plurality of wheels.

When the avoidance signal is inputted to the controller 800, the controller 800 may control the movement parts (e.g., the plurality of steering regions) so that the long-distance wheel is oriented in a direction intersecting (e.g., a direction perpendicular to) the direction in which the short-distance wheel is oriented. As described above, when the avoidance signal is inputted to the controller 800, the long-distance wheel may securely support the mobility vehicle 1 on the ground surface while the short-distance wheel moves.

In a detailed example, with reference back to FIGS. 2 and 6, when the avoidance signal is inputted to the controller 800, the first wheel (the wheel positioned at the right lower side based on FIG. 6) and the second wheel (the wheel positioned at the right upper side based on FIG. 6) can move away from each other (e.g., in the leftward/rightward direction) to increase a width of the mobility vehicle 1 in the leftward/rightward direction, and the third wheel (the wheel positioned at the left upper side based on FIG. 6) and the fourth wheel (the wheel positioned at the left lower side based on FIG. 6) can move toward the first wheel and the second wheel (e.g., forward), such that the mobility vehicle 1 may avoid the object A positioned rearward of the mobility vehicle 1.

The controller 800 may be electrically connected to the movement parts 200, the drive part 600, and the detection part 700 and implemented as a process that serves to decode and execute instructions on the basis of inputted information.

All the constituent elements, which constitute an embodiment of the present disclosure, may be integrally coupled or operate by being combined, but an embodiment of the present disclosure is not necessarily limited to such configuration. That is, one or more of the constituent elements may be selectively combined and operated for an embodiment of the present disclosure. Unless explicitly described to the contrary, the words "comprise," "include," or "have" and variations such as "comprises," "comprising," "includes," "including," has," or "having," can be understood to imply the inclusion of stated elements but not the exclusion of any other elements. Unless otherwise defined, terms including technical or scientific terms may have a same meaning as commonly understood by those skilled in the art to which the present disclosure pertains. Terms such as those defined in a commonly used dictionary may be interpreted as having meanings consistent with meanings in the context of related technologies and may not be interpreted as ideal or excessively formal meanings unless explicitly defined in the present disclosure.

The above description of example embodiments is simply given for illustratively describing the technical spirit of the present disclosure, and those skilled in the art to which the present disclosure pertains can appreciate that various changes and modifications can be possible without departing from the characteristic and scopes of the present disclosure. Therefore, the example embodiments disclosed in the present disclosure are provided for illustrative purposes and are not intended to necessarily limit the technical spirit of the present disclosure. The scopes of the technical spirit of the present disclosure are not necessarily limited thereby. The protective scopes of the present disclosure can be construed based on the following claims, and the technical spirit in the equivalent scopes thereto can be construed as falling within the scopes of the present disclosure.

What is claimed is:

1. A mobility vehicle comprising:

a body part;

a plurality of support frames configured to support the body part and pivot about a first rotation axis relative to the body part, wherein the first rotation axis extends in an upward/downward direction;

a plurality of movement parts respectively connected to the support frames, wherein the movement parts are configured to move the body part and the support frames relative to a ground surface;

a first engagement part on a lower surface of the body part; and a second engagement part on an upper surface of at least one of the support frames, wherein any one of the first engagement part and the second engagement part is a protrusion, and another one of the first engagement part and the second engagement part is a groove into which the protrusion is inserted, and wherein the body part and the support frames are configured to be allowed to rotate about the first rotation axis relative to one another in a state in which the body part and the support frames are supported on one another in a direction in which the first rotation axis extends.

2. The mobility vehicle of claim 1, wherein the first engagement part is a protrusion having a shape protruding downward from the lower surface of the body part, and wherein the second engagement part is a groove having a shape recessed downward from the upper surface of the at least one of the support frames.

3. The mobility vehicle of claim 2, wherein the second engagement part has an arc shape with a first radius based on the first rotation axis as a center, wherein the second engagement part is provided as a plurality of second engagement parts respectively provided on the support frames, and wherein the plurality of second engagement parts are disposed to be spaced apart from one another in a circumferential direction that is a direction in which the first engagement part extends.

4. The mobility vehicle of claim 3, wherein the support frames are configured to rotate about the first rotation axis relative to the body part between a first posture in which a horizontal width of the mobility vehicle is a maximum horizontal width and a second posture in which the horizontal width of the mobility vehicle is a minimum horizontal width, and wherein the mobility vehicle further comprises a motion restriction part configured to restrict motions of the support frames at the second posture.

5. The mobility vehicle of claim 4, wherein the motion restriction part is positioned between two of the second engagement parts being adjacent to each other in the circumferential direction.

6. The mobility vehicle of claim 5, wherein the motion restriction part is provided as a plurality of motion restriction parts, wherein each of the plurality of motion restriction parts has a shape protruding in a horizontal direction from a respective support frame among the support frames, and wherein two of the plurality of motion restriction parts being adjacent to each other are in contact with each other when the support frames are placed in the second posture.

7. The mobility vehicle of claim 5, wherein the motion restriction part is provided as a plurality of motion restriction parts, wherein each of the plurality of motion restriction parts has a shape protruding downward from the lower surface of the body part, and wherein the plurality of motion restriction parts and the plurality of second engagement parts are alternately disposed in the circumferential direction.

8. The mobility vehicle of claim 2, further comprising a link configured to pivotably couple the support frames together and define the first rotation axis, wherein the first engagement part is positioned radially outside of the link with respect to the first rotation axis.

9. The mobility vehicle of claim 8, wherein the second engagement part is disposed between the link and one distal end of at least one of the support frames.

10. The mobility vehicle of claim 1, further comprising:

a link configured to pivotably couple the support frames and define the first rotation axis; and an encoder configured to acquire information on angles defined by the support frames relative to each other, wherein the encoder is disposed below the link.

11. The mobility vehicle of claim 10, further comprising a brake configured to stop movements of the support frames relative to each other, wherein the brake is disposed below the link.

12. A mobility vehicle comprising:

a body part;

support frames configured to support the body part and pivot about a first rotation axis relative to the body part;

movement parts respectively connected to the support frames, wherein the movement parts are configured to move the body part and the support frames, and wherein the movement parts comprise front wheels and rear wheels respectively connected to the support frames;

a drive part configured to provide power for rotating the support frames; and a controller configured to control motions of the support frames to adjust a horizontal width of the mobility vehicle, wherein the controller is configured to control the movement parts so that speeds of the front and rear wheels are different from one another in response to any one of a contraction signal and an expansion signal being provided, and wherein the contraction signal indicates that the horizontal width of the mobility vehicle is to be decreased, and the expansion signal indicates that the horizontal width of the mobility vehicle is to be increased.

13. The mobility vehicle of claim 12, further comprising a detection part configured to detect a change in width of a space in a peripheral region of the mobility vehicle, wherein the controller receives a contraction signal or an expansion signal from the detection part.

14. The mobility vehicle of claim 12, wherein the support frames comprise:

a first support frame extending in a first direction, wherein the first support frame has a first central portion; and a second support frame having a second central portion disposed to intersect the first central portion of the first support frame, wherein the second support frame extends in a second direction intersecting the first direction.

15. The mobility vehicle of claim 14, wherein the first support frame comprises:

a first-first frame region including a first-first end of the first support frame and extending from the first central portion of the first support frame to a first-first side of the first support frame based on the first direction, and a first-second frame region including a first-second end of the first support frame and extending from the first central portion of the first support frame to a first-second side of the first support frame based on the first direction;

wherein the second support frame comprises:

a second-first frame region including a second-first end of the second support frame and extending from the second central portion of the second support frame to a second-first side of the second support frame based on the second direction; and a second-second frame region including a second-second end of the second support frame and extending from the second central portion of the second support frame to a second-second side of the second support frame based on the second direction; and wherein the first-first frame region, the second-first frame region, the first-second frame region, and the second-second frame region are disposed along a circumferential direction.

16. The mobility vehicle of claim 15, wherein the controller is configured to:

control motions of the support frames so that the first-first end of the first-first frame region and the second-first end of the second-first frame region become closer to each other when the contraction signal is provided, and control motions of the support frames so that the first-first end of the first-first frame region and the second-first end of the second-first frame region become more distant from each other when the expansion signal is provided.

17. The mobility vehicle of claim 16:

wherein the front wheels are respectively connected to the first-first end of the first-first frame region and the second-first end of the second-first frame region, and wherein the rear wheels are respectively connected to the first-second end of the first-second frame region and the second-second end of the second-second frame region.

18. The mobility vehicle of claim 17, further comprising a detection part configured to detect an object motion of an external object in a peripheral region of the mobility vehicle, and wherein the controller is configured to:

receive, from the detection part, an avoidance signal, wherein the avoidance signal indicates that the mobility vehicle is to avoid the external object in response to the object motion of the external object in the peripheral region being detected by the detection part, and control the movement parts so that a long-distance wheel is oriented in a first rolling direction intersecting a second rolling direction of a short-distance wheel, wherein any one of the front wheels and the rear wheels that is positioned closest to the external object is a short-distance wheel, and wherein any other one of the front wheels and the rear wheels that is positioned farthest from the external object is a long-distance wheel.

19. A method of controlling a mobility vehicle, wherein the mobility vehicle comprises:

a body part;

support frames configured to support the body part and pivot about a first rotation axis relative to the body part;

movement parts respectively connected to the support frames, wherein the movement parts are configured to move the body part and the support frames, and wherein the movement parts comprise front wheels and rear wheels respectively connected to the support frames; and a controller configured to control motions of the support frames, wherein the support frames comprise:

(i) a first support frame extending in a first direction, wherein the first support frame has a first central portion, wherein the first support frame comprises:

a first-first frame region including a first-first end of the first support frame and extending from the first central portion of the first support frame to a first-first side of the first support frame based on the first direction, and a first-second frame region including a first-second end of the first support frame and extending from the first central portion of the first support frame to a first-second side of the first support frame based on the first direction; and (ii) a second support frame having a second central portion disposed to intersect the first central portion of the first support frame, wherein the second support frame extends in a second direction intersecting the first direction, wherein the second support frame comprises:

a second-first frame region including a second-first end of the second support frame and extending from the second central portion of the second support frame to a second-first side of the second support frame based on the second direction, and a second-second frame region including a second-second end of the second support frame and extending from the second central portion of the second support frame to a second-second side of the second support frame based on the second direction; and wherein the first-first frame region, the second-first frame region, the first-second frame region, and the second-second frame region are disposed along a circumferential direction, and wherein the method comprises:

receiving a contraction signal indicating that a horizontal width of the mobility vehicle is to be decreased;

controlling motions of the support frames so that the first-first end of the first-first frame region and the second-first end of the second-first frame region become closer to each other in response to the contraction signal being received;

receiving an expansion signal indicating that the horizontal width of the mobility vehicle is to be increased;

controlling motions of the support frames so that the first-first end of the first-first frame region and the second-first end of the second-first frame region become more distant from each other in response to the expansion signal being received;

detecting an object motion of an external object in a peripheral region of the mobility vehicle;

providing an avoidance signal to the controller, wherein the avoidance signal indicates that the mobility vehicle is to avoid the external object in response to the object motion of the external object in the peripheral region being detected; and orienting a long-distance wheel in a first rolling direction intersecting a second rolling direction of a short-distance wheel in response to the avoidance signal being provided to the controller, wherein any one of the front wheels and the rear wheels that is positioned closest to the external object is a short-distance wheel, and wherein any other one of the front wheels and the rear wheels that is positioned farthest from the external object is a long-distance wheel.

20. The method of claim 19, wherein the front wheels are respectively connected to the first-first end of the first-first frame region and the second-first end of the second-first frame region, and wherein the rear wheels are respectively connected to the first-second end of the first-second frame region and the second-second end of the second-second frame region; and wherein the method further comprises controlling speeds of the front wheels and the rear wheels at different speeds from one another during the controlling motions in response to the contraction signal or during the controlling motions in response to the expansion signal.

* * * * *